United States Patent

Hall, Jr. et al.

[15] 3,670,890
[45] June 20, 1972

[54] LIQUID WASTE FEED SYSTEM

[72] Inventors: John B. Hall, Jr.; Yi Tung, both of Newport News; Lavern E. Winn, Hampton, all of Va.

[73] Assignee: The United States of America as represented by the Administrator of the National Aeronautics and Space Administration

[22] Filed: Jan. 15, 1970

[21] Appl. No.: 3,151

[52] U.S. Cl............................210/104, 210/103, 210/110, 210/137
[51] Int. Cl..........................................................B01d 43/00
[58] Field of Search....................210/98, 103, 104, 110, 111, 210/128, 137, 167

[56] References Cited

UNITED STATES PATENTS

| | | | |
|---|---|---|---|
| 1,691,862 | 11/1928 | Thompson et al. | 210/98 |
| 3,565,252 | 2/1971 | Sheehy | 210/104 |
| 1,943,098 | 1/1934 | Meer | 210/104 |
| 2,977,795 | 4/1961 | Hill | 73/198 |

*Primary Examiner*—John Adee
*Attorney*—Howard J. Osborn and G. T. McCoy

[57] ABSTRACT

A pressurized liquid waste tank feeds liquid waste into liquid waste processing equipment. The processed liquid is pumped into an accumulator tank which has an actuator that opens and closes microswitches as the accumulator tank is filled and emptied. These microswitches control solenoid valves which are located in the lines feeding the liquid waste processing equipment, the accumulator tank and the collecting tank. An electrical circuit ties together the switches and valves in a manner such that sufficient waste liquid is automatically maintained in the liquid waste processing equipment to give optimum system performance in a zero gravity environment.

9 Claims, 4 Drawing Figures

PATENTED JUN 20 1972

INVENTORS
JOHN B. HALL, JR.
YI TUNG
LAVERN E. WINN

BY

ATTORNEYS 3,670,890

1

LIQUID WASTE FEED SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION AND PRIOR ART

Various techniques have been utilized to maintain sufficient waste liquid in liquid waste processing equipment. One such technique is the use of pressure, temperature or humidity sensors placed in the liquid waste processing equipment. These sensors which are normally set for sensing constant parameters respond to the transient conditions occurring in the processor due to solids buildup as the waste liquids are processed. Although such a system is operable to a degree, the use of sensors usually results in either flooding the waste processing equipment or operation of the system too dry for efficient water recovery from the liquid wastes.

Another technique utilized is that of timers to actuate the feed circuits to the liquid waste processing equipment. The use of such timers requires a constant waste water processing rate. However, the processing rate will change with either solid buildup in the processor or a change in operating parameters. Since a water recovery system on an extended space mission usually will not operate according to constant times and parameters, it is apparent that the use of timers will not satisfy the requirements for an operable system.

SUMMARY OF THE INVENTION

The present invention overcomes the above-mentioned difficulties by providing a feed system which basically consists of a feed circuit and a sensing circuit to control the flow of waste liquids to and from the processing equipment. The feed system is controlled by valves which permit the liquid waste to flow from a supply source to the waste water processing equipment. The processed water is then pumped into an accumulator which actuates the sensing circuit. When sufficient processed liquid has been collected in the accumulator, the valves are operated to discharge the processed liquid into a collecting tank. The sensing circuit at this time also actuates valves which provide the liquid waste processing equipment with a new supply of waste liquid, initiating a new cycle. With proper adjustment of the valves and the sensing microswitches, the right amount of liquid waste is always available to the liquid waste processing equipment to enable it to operate at optimum efficiency. Such an arrangement also provides equipment which will operate efficiently and reliably in a zero gravity environment. Since the supply of liquid waste to the processing equipment is dependent on the amount of liquid actually processed, the entire system is automatically self-regulating providing an optimum arrangement for use over an extended period of time.

DESCRIPTION OF THE PREFERRED EMBODIMENTS

Figure 1:
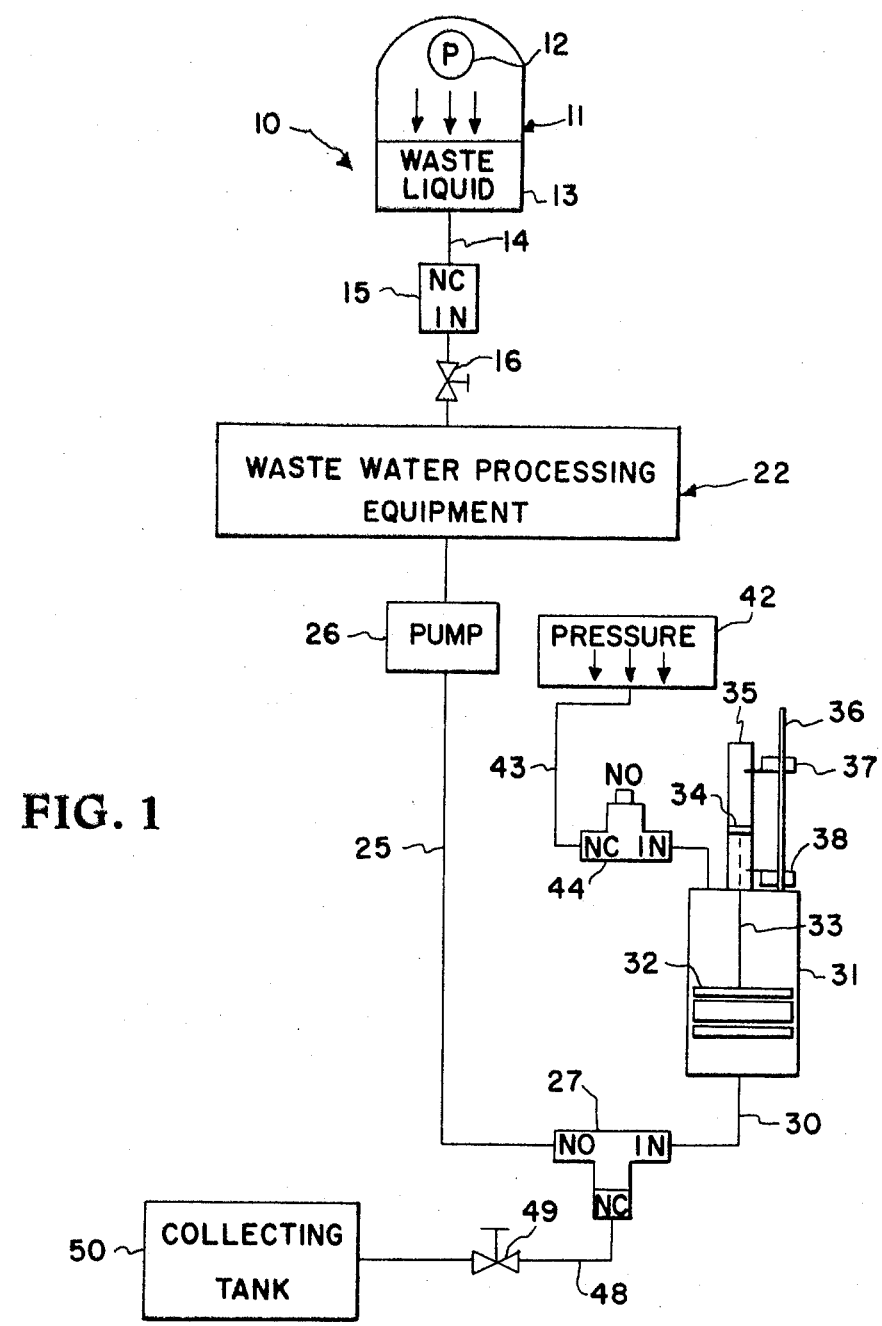
FIG. 1 is a diagrammatic view showing the various components of the liquid waste feed system.

Referring now to the details of the invention, the reference numeral 10 designates generally the invention waste feed system as shown in FIG. 1.

The supply tank 11 provides a storage means for the liquid waste. The liquid waste may come from various sources, and would be collected and piped to the tank in a spacecraft or space station which would be utilizing liquid waste processing equipment for the recovery of water or other liquids from the waste. The tank 11 contains a pump 12 or some other device for creating pressure within the tank. Liquid waste 13 is shown as being at some level in the tank 11. The conduit 14 is connected to the liquid waste processing equipment 22. Located in the conduit 14 between the supply tank and the processing equipment is a solenoid valve 15 having a normally closed port NC and an open port IN. A throttling valve 16 is also connected into the conduit 14. The purpose and operation of these valves will be explained in greater detail subsequently. The liquid waste processing equipment 22 may be for the purpose of recovering potable water from liquid waste or other liquids from waste. Various types of this equipment are known and therefore the particular details of the equipment need not be explained.

A discharge conduit 25 connects the liquid waste processing equipment with solenoid valve 27 which has a normally closed port NC, a normally open port NO, and an open port IN. The purpose of solenoid valve 27 will be explained more fully subsequently. A pump 26 is located in line 25 and is utilized to pump the processed liquid out of the processing equipment to the solenoid valve 27.

A conduit 30 connects the solenoid valve 27 with an accumulator tank 31. A piston 32 is located within the accumulator tank 31 and is movable under the influence of processed liquid which is conveyed from the processing equipment via conduit 25 through the solenoid valve 27 and conduit 30. Connected to the piston 32 is a rod 33 which projects through the top surface of the tank. A switch trigger 34 is connected to the end of the rod 33 and is movable in a guide 35 which is attached to the accumulator tank. A switch post 36 is also connected to the accumulator tank and carries microswitches 37 and 38. The microswitch 37 is positioned adjacent the top of the rod and the microswitch 38 adjacent the top of the accumulator tank. The switches 37 and 38 have projections which are encountered by the movement of the switch trigger 34 to open and close the switches for reasons which will be explained in detail subsequently. A pressure tank or source of pressure 42 is located adjacent the accumulator tank 31 and has a conduit 43 which connects with the accumulator tank 31. A solenoid valve 44 is located in conduit 43 and controls flow of pressure into the accumulator tank for moving piston 32 to discharge processed liquid from the accumulator tank. The solenoid valve 44 has a normally closed port NC, an open port IN, and a normally open vent port NO.

Figure 4:
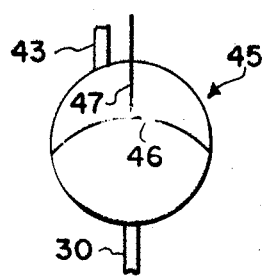
FIG. 4 is a cross sectional view of an accumulator tank modification.

A modified form of accumulator tank is shown in FIG. 4 and is designated generally by the reference numeral 45. The accumulator tank 45 is spherical and contains a flexible diaphragm 46. A rod 47 is connected to the diaphragm 46 and projects through the top of the tank. The tank would connect to the conduits 43 and 30 similar to the accumulator tank 31. The rod 47 would have a switch trigger similar to 34 to actuate the microswitches.

A collecting tank 50 is connected by conduit 48 to the solenoid valve 27. The collecting tank 50 receives processed liquid discharged from the accumulator tank 31. A throttling valve 49 is located in conduit 48 operates to control the time required to expel the processed water from the accumulator tank 31 to the collecting tank 50.

Figure 2:
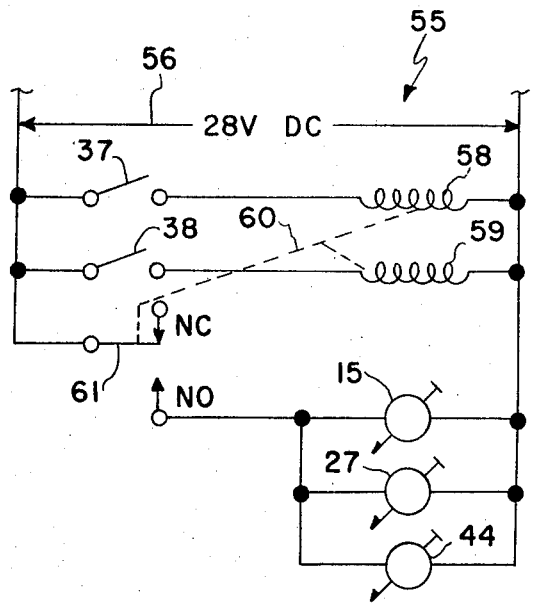
FIG. 2 is a schematic view of the electrical circuit utilized to control the components of the liquid waste feed system.

The electrical circuit designated generally by the reference numeral 55 utilized in controlling the various components of the feed system is shown in FIG. 2. A power supply 56 is provided in the form of a battery or some other similar device. Microswitches 37 and 38 are positioned in parallel with the power supply. A relay coil 58 is in series with microswitch 37 and a relay coil 59 is positioned in series with microswitch 38. The relay coils are linked to switch contacts 61 which are positioned in series with the solenoid valves 15, 27 and 44. The switch contacts and solenoid valves as a unit are placed in parallel with the power supply and other components of the system.

Figure 3:
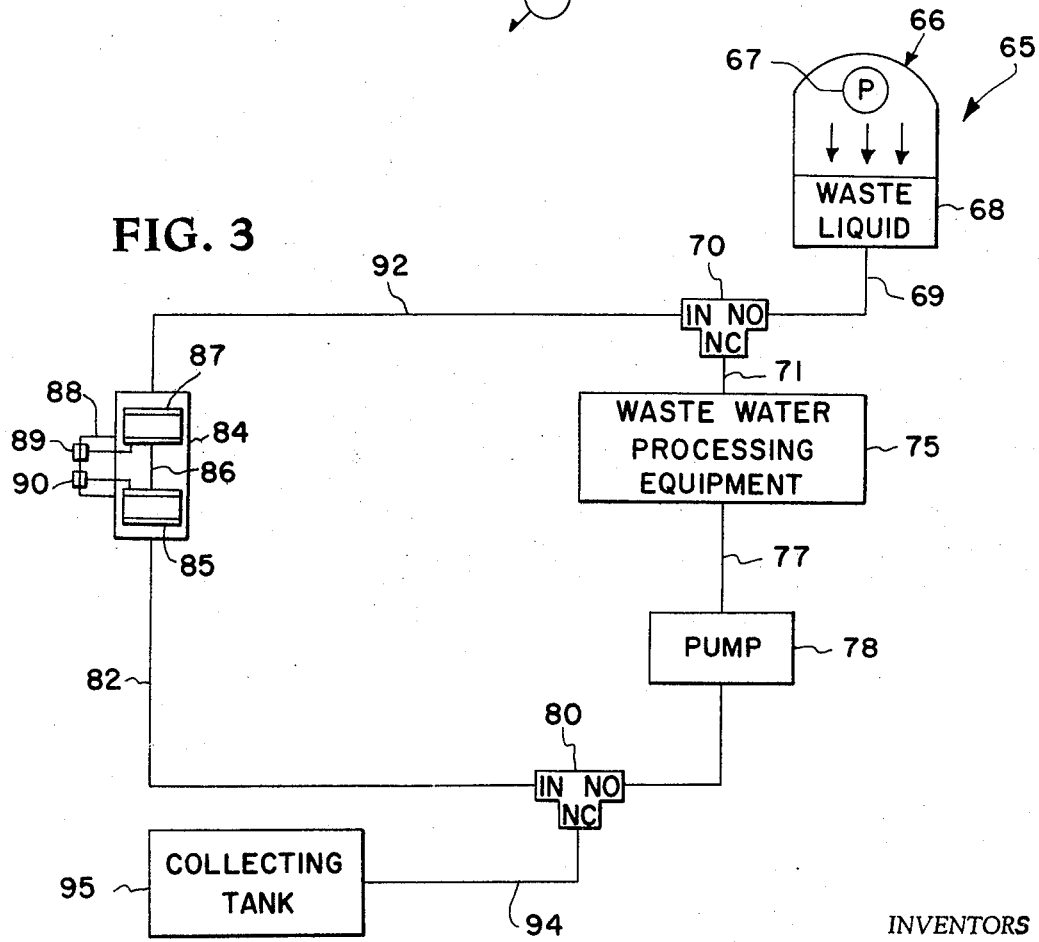
FIG. 3 is a diagrammatic view of a modified form of liquid feed system.

An alternate embodiment of the invention is shown in FIG. 3 and designated generally by the reference numeral 65. In this embodiment of the invention, the supply tank 66 contains liquid waste 68 which is placed under pressure by a pump or other source of pressure 67. The supply tank 65 is connected to a solenoid valve 70 by the line 69. The solenoid valve 70 has a normally open port NO, a normally closed port NC, and an open port IN. Another line 71 connects the solenoid valve 70 with the liquid waste processing equipment 75. The liquid waste processing equipment 75 is similar to the equipment 22 discussed with regard to the previous embodiment. A discharge line 77 connects the liquid waste processing equipment with another solenoid valve 80. This valve also has a normally closed port NC, a normally open port NO, and an open port IN. A pump 78 is located in the discharge line and is utilized to pump liquid from the processing equipment to the solenoid valve 80.

A lower accumulator line 82 connects the solenoid valve 80 with the accumulator tank 84. The accumulator tank 84 houses a double ended piston arrangement having heads 85 and 87 with an intermediate connecting rod 86. A bracket 88 fixed to the accumulator tank 84 carries microswitches 89 and 90. The microswitches have fingers which are actuated by the piston heads 85 and 87 to open and close the switches. An upper accumulator line 92 connects the other side of the accumulator tank 84 with the solenoid valve 70.

A collecting tank line 94 connects the solenoid valve 80 with collecting tank 95.

The electrical circuit shown in FIG. 2 may be utilized to control the feed system embodiment 65; therefore, the explanation of another circuit is not considered necessary.

OPERATION

In operation, the supply tank or storage tank 11 contains waste liquid which has been collected by means of a waste collecting system. The liquid waste processing equipment is also filled to the desired capacity to initiate operation. The liquid waste processing equipment is activated together with the pump 26 and as the liquid is processed, it is pumped through the conduit 25 to the solenoid valve 27. The solenoid valve port connected with the line 25 is normally open, allowing the processed liquid to be conveyed through the conduit 30 to the accumulator tank 31.

As the accumulator tank 31 is filled with processed liquid, it will be apparent that piston 32 is forced in an upward direction. Any air which might be trapped on the top side of the piston is vented through the solenoid valve 44 port vent. The accumulator tank fills until the piston and its rod assembly moves to the vicinity of microswitch 37. The switch trigger 34 then closes microswitch 37 which completes a circuit to the relay coil 58 (FIG. 2). The relay coil 58 will move the switch contact 61 from the NC position to the NO position completing a circuit to the solenoid valves 15, 27 and 44. The normally closed solenoid valve 15 is thereby opened allowing the waste liquid in the supply tank 11 to flow into the liquid waste processing equipment 22. The amount of flow can be regulated by the throttling valve 16.

At the same time, the normally closed solenoid valve 44 is opened allowing pressure from source 42 to enter the top side of the accumulator tank 31 via the conduit 43. The pressure on the top side of the piston causes it to move down forcing processed liquid out of the accumulator tank into conduit 30. Normally opened solenoid valve 27 is closed when the solenoid valves 15 and 44 are opened thus preventing processed water from conduit 25 to pass through the valve 27, but allowing the processed water 30 being discharged from the accumulator tank 31 to pass through the valve 27 into the conduit 48 and to the collecting tank 50. The throttling valve 49 may be utilized to control the rate of flow from the accumulator tank to the collecting tank 50. It is apparent from the discussion thus far that the throttling valves 16 and 49 may be used in conjunction to provide a balance for the feed system.

When the piston 32 bottoms in the accumulator tank 31, the switch trigger 34 will actuate microswitch 38 which will activate relay coil 59 (FIG. 2). This will cause switch contact 61 to move to the NC position opening the circuit to solenoid valves 15, 27 and 44. Solenoid valve 15 will then assume its normally closed position preventing waste liquid from passing out of the supply tank 11 into the waste water processing equipment 22. Solenoid valve 27 will assume its normally open position allowing the processed liquid from the processing device 22 to pass through the valve into the accumulator tank 31. The solenoid valve 27 will also close the passage to conduit 48 and the collecting tank 50. The solenoid valve 44 will assume its normally closed position venting the top side of the accumulator tank 31. The feed system then recycles as described and continues to recycle in a manner which automatically maintains the proper amount of liquid waste in the liquid waste water processing equipment.

The operation of the alternate liquid waste feed system 65 shown in FIG. 3 is similar to that of the system 10; however, it differs somewhat in that the system is a simpler design. As with system 10, the liquid waste processing equipment 75 is initially charged with a sufficient quantity of waste liquid. Since solenoid 70 is normally open, and the waste liquid in supply tank 68 is under pressure, the top side of the accumulator tank 84 is also filled via the line 92.

As the water is processed, it is pumped via the conduit 77 through pump 78 into the solenoid valve 80. The normally opened portion of solenoid valve 80 allows the processed liquid to flow into line 82 and the bottom side of the accumulator tank 84. When the piston 85 moves a sufficient distance, the appropriate microswitch is energized making a circuit to the relay coil which closes the switch contact on the solenoid valves closing the normally open ports and opening the normally closed ports. The processed liquid is then forced out of the bottom side of the accumulator tank 84 into the line 82 through the solenoid valve 80 into the line 94 and to the collecting tank 95. This is accomplished by the pressurized liquid waste from supply tank 65 operating on the piston 87 in the top side of the accumulator tank 84. When the processed liquid water has been discharged from the accumulator tank 84, the piston 87 will have reached a point to actuate the appropriate microswitch and activate a relay which closes the switch contacts on the solenoid valves and returns them to their normally open and closed positions. The cycle then repeats itself and continues to repeat itself to provide the proper amount of waste liquid to the liquid waste processing equipment.

The electrical circuit shown in the FIG. 2 is utilized to control the modified waste system 65. However, since only two solenoid valves are utilized, one of the valves would be eliminated from the circuit. Since the circuits are essentially identical for both embodiments, a detailed description of a circuit for the FIG. 3 embodiment has been eliminated. Although not shown in the FIG. 3 embodiment, it is to be understood that throttling valves may also be utilized in the lines leading to the liquid waste processing equipment and the collecting tank as in the FIG. 1 embodiment.

The device is believed to have a decided advantage over the prior art in that the system is not dependent on process rates nor rely on constant conditions within the processing equipment to initiate the liquid feed circuit. The quantity of waste liquid required in the processor for optimum performance can be maintained by the control circuit such that essentially the quantity of water processed from the system is replaced by an equal or additional amount of waste liquid. The system is highly reliable, has few components and working parts providing a generally maintenance-free system. The feed system is also particularly adapted to operation in the zero gravity environment without being subject to the various parameters which affect such as environment.

It is to be understood that the foregoing disclosure relates only to preferred embodiments of the invention and that numerous modifications and variations of the present invention are possible in the light of the above teachings without departing from the spirit or scope of the invention as set forth in the appended claims.

What is claimed as new and desired to be secured by Letters Patent of the United States is:

1. A waste liquid feed system comprising:
   means for containing waste liquid under pressure;
   means for pressurizing said means for containing waste;
   waste liquid processing means;
   means for collecting processed waste liquid;
   means to automatically maintain sufficient liquid in said liquid processing means in a zero gravity environment including accumulator means;
   actuator means positioned in said accumulator means openable by processed liquid flow in said accumulator means; and
   valve means controlled by said actuator means in lines providing fluid communication between said means for containing waste liquid, said liquid processing means, said accumulator means, and said collecting tank means to give optimum performance in a zero gravity environment.

2. A waste liquid feed system as in claim 1 wherein switch means is associated with said actuator means for opening and closing said valve means, and electrical circuit means for controlling said switch means and valve means.

3. A waste liquid feed system as in claim 2 wherein said actuator is a piston and rod.

4. A waste liquid feed system as in claim 2 wherein said actuator is a diaphragm.

5. A waste liquid feed system as in claim 1 wherein said valve means includes a first solenoid valve between said means for containing liquid and said liquid processing means; a second solenoid valve between a source of pressure and said accumulator tank means; and a third solenoid valve between said waste liquid processing equipment and said accumulator tank means and collecting tank means.

6. A waste liquid feed system as in claim 1 wherein said valve means includes a first throttling valve at the input of said waste liquid processing equipment; and a second throttling valve at the input of said collecting tank means.

7. A waste liquid feed system as in claim 1 wherein said accumulator tank means includes an actuator; a first solenoid valve located at the output of said means for containing liquid waste and regulating flow to said waste liquid processing equipment and to one side of said accumulator tank actuator means; and a second solenoid valve located between said waste liquid processing equipment and said accumulator tank means and collecting tank means; said second solenoid valve regulating flow to the other side of the actuator means and to said collecting tank means.

8. A waste liquid feed system as in claim 7 wherein switches are associated with said actuator means; said switches being opened and closed by movement of said actuator means and controlling said first and second solenoid valve.

9. A waste liquid feed system as in claim 7 wherein pump means draws processed liquid out of said processing equipment and pumps it into said accumulator tank means and said collecting tank means.

* * * * *